United States Patent [19]

Cheung et al.

[11] Patent Number: 4,952,271
[45] Date of Patent: Aug. 28, 1990

[54] APPARATUS FOR FORMING AN OFFSET JOINT IN FLEXIBLE THERMOPLASTIC STRAP

[75] Inventors: Nelson Cheung, Hoffman Estates; Robert J. Nix, Algonquin, both of Ill.

[73] Assignee: Signode Corporation, Glenview, Ill.

[21] Appl. No.: 371,217

[22] Filed: Jun. 26, 1989

[51] Int. Cl.$^5$ .................. B29C 65/06; B65B 13/32
[52] U.S. Cl. ........................... 156/502; 53/589; 100/33 PB; 156/73.5; 156/580; 156/581
[58] Field of Search .................. 100/33 PB; 428/57; 53/399, 589; 156/73.4, 73.5, 157, 196, 221, 468, 499, 502, 510, 580, 580.2, 581, 583.1, 443

[56] References Cited

U.S. PATENT DOCUMENTS

| | | | |
|---|---|---|---|
| 3,442,732 | 5/1969 | Stensaker et al. | 156/73.5 |
| 3,586,572 | 6/1971 | Ericsson | 156/359 |
| 3,669,799 | 6/1972 | Vilcins et al. | 156/359 |
| 3,679,519 | 7/1972 | Frey | 156/359 |
| 3,878,015 | 4/1975 | Johnston | 156/581 |
| 3,996,403 | 12/1976 | Gould et al. | 428/198 |
| 4,050,372 | 9/1977 | Kobiella | 100/2 |
| 4,096,019 | 6/1978 | Lehmann | 156/580 |
| 4,119,449 | 10/1978 | Gould et al. | 156/73.5 |
| 4,153,499 | 5/1979 | Annis | 156/494 |
| 4,313,779 | 2/1982 | Nix | 156/361 |
| 4,776,905 | 10/1988 | Cheung et al. | 156/73.5 |

Primary Examiner—Michael Wityshyn
Attorney, Agent, or Firm—Thomas W. Buckman; Donald J. Breh

[57] ABSTRACT

An apparatus is provided for creating an improved configuration of overlapping lengths of flexible thermoplastic strap to accommodate the formation of an improved joint between the strap portions. The apparatus includes first and second strap engaging members respectively defining first and second contoured surfaces for engaging respectively first and second strap lengths to position the joint portions between the strap engaging members in an overlapping relationship along an interface region and to position the trailing portion of each strap length to extend in a plane generally parallel to a reference plane with at least a part of the length of the interface region being non-parallel to the reference plane. In the preferred embodiment, the strap engaging members are each provided with a convex surface and a concave surface and are disposed to align the concave surface of one member generally in registry with the convex surface of the other member.

42 Claims, 5 Drawing Sheets

APPARATUS FOR FORMING AN OFFSET JOINT IN FLEXIBLE THERMOPLASTIC STRAP

TECHNICAL FIELD

This invention relates to a subassembly of components for providing an improved configuration of overlapping lengths of flexible thermoplastic strap which will accommodate the prior, concurrent, or subsequent formation of a sealless joint therebetween.

BACKGROUND OF THE INVENTION AND TECHNICAL PROBLEMS POSED BY THE PRIOR ART

A variety of methods and apparatus have been marketed and/or proposed for securing together overlapping portions of thermoplastic strap, especially thermoplastic strap that has been encircled about an article or articles to form a loop and that has then been tensioned.

Conventional thermoplastic strapping material includes nylon, polypropylene, and polyester. Overlapping portions of strap formed from such materials may be joined together with suitable sealless techniques, including techniques employing bonding agents (e.g., adhesives) or welding (e.g., conventional hot knife or friction-fusion welding).

Regardless of the manner in which sealless joints are created between overlapping portions of thermoplastic strap, the strength of the joint is, obviously, of great importance. Such joints may not be as strong as the strap itself. The joint must have sufficient tensile strength to resist forces acting on the weld in the direction of the strap length. The joint must also have sufficient peel strength to resist forces which tend to act through the strap on the joint generally obliquely or perpendicularly to the length of the strap.

In some situations, a relatively low peel strength is desired. For example, a strap loop around an article may be easily removed if the strap joint can be readily peeled open. On the other hand, an excessively low peel strength can present problems where unintentional opening of the joint is not desired. For example, if an end of the outermost overlapping portion of strap is snagged during the handling of the strap or of article bound thereby, then the joint may peel open.

With welded joints, the peel strength may be considerably less than the tensile strength of the joint. Further, the problem of peel strength joint failure is more prevalent for thicker strap than for thinner strap.

It would be desirable to provide apparatus for providing an improved joint between overlapping thermoplastic strap portions—especially a joint with greater resistance to peel forces.

Further, it would be advantageous to provide apparatus for providing an improved configuration of lengths of flexible thermoplastic strap so as to accommodate the formation of an improved joint which has been formed previously or which may be formed simultaneously with, or after, the use of the apparatus.

It would be especially beneficial if such apparatus could be readily used with, or incorporated in, existing or new strapping tools and machines employing friction-fusion welding principles of operation because a variety of friction-fusion strap welding tools and machines have been successfully introduced over the years and are in widespread commercial use around the world.

Improved joints between overlapping lengths of flexible thermoplastic strap, and methods for producing the improved joints, are disclosed in the copending U.S. patent application Ser. No. 07/347,569 entitled "Improved Strapping Joint And Method For Forming Same" filed on May 5, 1989 by Nelson Cheung, Robert J. Nix, and Janusz P Figiel and assigned to the assignee of the present application. FIG. 5 in that copending patent application illustrates a welded joint wherein, prior to tensile loading of the joint area, the overlapping strap portions are deformed in a Z-like configuration by laterally relatively displacing the non-welded portions of the strap to lie on opposite sides of the then angularly disposed, planar connecting weld. The trailing portions of the strap are preferably parallel to each other. The description of the joint illustrated in FIG. 5 of the above-identified U.S. patent application and the description of the method of forming it are incorporated herein by reference thereto to the extent that such disclosures are not inconsistent with the present disclosures.

It has been found that by forming the strap so that the non-welded portions of the strap lie on opposite sides of the angularly disposed planar weld, there is an elimination or reduction of the force component which would induce peeling failure (i.e., separation) when the non-welded strap portions are loaded in tension.

This improvement results if the welded joint between the two overlapping strap portions is formed as discussed above substantially simultaneously with the formation of the welded joint. However, it is contemplated that the improved configuration could be created after a conventional joint is formed. Also, it is contemplated that the unique configuration could be formed in the overlapping strap portions before the weld per se is made.

It would be desirable to provide apparatus for producing such a configuration, or functionally equivalent configuration, in overlapping strap portions in a joint region.

Further, it would be beneficial if other embodiments of such apparatus could provide other improved configurations of the strap portions for accommodating the formation of a joint with even greater resistance to peel forces and for readily accommodating the formation of such a joint in conjunction with conventional friction-fusion welding techniques.

SUMMARY OF THE INVENTION

A preferred form of the apparatus of the present invention provides an improved configuration for first and second lengths of flexible thermoplastic strap to accommodate formation of an improved joint therebetween wherein the lengths of strap each have a joint portion and an associated trailing portion. The joint portion of each strap length is that portion of the strap length which is, or which will become, part of a direct face-to-face connection or joint between the overlapping strap lengths. The trailing portion of each strap length extends from the joint portion in a direction away from the other strap length trailing portion.

The apparatus includes first and second opposed, contoured surface means for engaging the strap lengths. The first and second contoured surface means are preferably defined by first and second strap engaging members, respectively. The strap length joint portions are positioned between the opposed contoured surface means in an overlapping face-to-face relationship along an interface region.

In one preferred embodiment, each contoured surface means defines a convex surface and a concave surface. The contoured surface means are disposed to align the concave surface of the first contoured surface means generally in registry with the convex surface of the second contoured surface means and to align the convex surface of the first contoured surface means generally in registry with the concave surface of the second contoured surface means.

Further, in the preferred embodiment, the contoured surface means also function to orient each strap length trailing portion to extend in a plane generally parallel to a reference plane with at least a part of the length of the interface region being non-parallel to the reference plane.

The apparatus may further include means for effecting relative movement between the opposed contoured surface means to press the strap joint portions together and for forming a joint between the joint portions while the strap lengths are pressed together.

It has been found that a joint formed in overlapping strap portions with the improved configuration provided by the apparatus of the present invention exhibits greater resistance to peel forces. It is believed that the configuration of the strap portions at the joint is such that the overlapping strap portions resist separation when the strap trailing portions on either side of the joint are loaded under tension because the peeling force component is reduced or eliminated.

Numerous other advantages and features of the present invention will become readily apparent from the foregoing detailed description of the invention, from the claims, and from the accompanying drawings.

BRIEF DESCRIPTION OF THE DRAWINGS

In the accompanying drawings forming part of the specification, in which like numerals are employed to designate like parts througout the same.

DESCRIPTION OF THE PREFERRED EMBODIMENTS

While this invention is susceptible of embodiment in many different forms, this specification and the accompanying drawings disclose only some specific forms as examples of the use of the invention. The invention is not intended to be limited to the embodiments so described, and the scope of the invention will be pointed out in the appended claims.

The sizes of the components herein described are not essential to the invention unless otherwise indicated. For ease of description, the apparatus of this invention is described in a normal (upright) operating position, and terms such as upper, lower, horizontal, etc., are used with reference to this position. It will be understood, however, that the apparatus of this invention may be manufactured, stored, transported, used, and sold in an orientation other than the position described.

The apparatus of this invention may be used with, or may include, certain conventional components the details of which, although not fully illustrated or described, will be apparent to those having skill in the art and an understanding of the necessary functions of such components.

Figure 1:
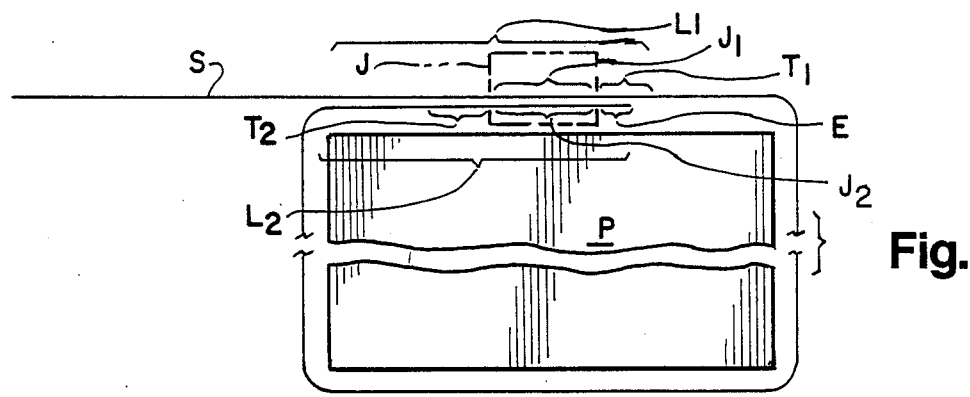
FIG. 1 is a simplified, diagrammatic view of thermoplastic strap encircled about an article with portions of the strap overlapped in a face-to-face orientation in the region where the strap portions are to be joined together.

FIG. 1 illustrates, in simplified, diagrammatic form, the binding of an article or package P with an encircling loop of strap S. For purposes of clarity of illustration, the strap S is shown spaced outwardly from the package P and with spaced-apart overlapping strap lengths $L_1$ and $L_2$. Typically, an end segment E of the overlapping length $L_2$ is gripped (by conventional means not illustrated), and the strap S is pulled to tension the strap loop tightly about the article P.

Then, the overlapping strap lengths $L_1$ and $L_2$ are connected or joined together in a joint region, such as in the region indicated within the broken line box J in FIG. 1. The section of each length $L_1$ and $L_2$ in the joint region J may be defined as the joint portion $J_1$ and $J_2$, respectively. This terminology is used in this specification and in the appended claims to describe the joint portions $J_1$ and $J_2$ both before and after the joint is actually created.

The tensioned loop portion of the strap S may be characterized as having a trailing portion $T_1$ extending from the strap length $L_1$ beyond the joint portion $J_1$ and as having a trailing portion $T_2$ extending from the strap length $L_2$ in the opposite direction beyond the joint portion $J_2$. In a conventional joint, the trailing portions $T_1$ and $T_2$ typically extend generally in substantially parallel planes, at least immediately adjacent the joint region J, when the strap lengths $L_1$ and $L_2$ are initially positioned in a conventional strapping tool that draws tension and forms a joint between the overlapping strap portions. During the formation of the joint in a conventional strapping tool or machine, the length of each parallel trailing portion $T_1$ and $T_2$ that is positioned in the tool may be longer or shorter than the length of the joint per se. At some distance from the joint region, the trailing portions $T_1$ and $T_2$ no longer remain parallel and instead are oriented in other directions (owing to influences of the strapping tool, strap tension, or package configuration).

In some applications it is contemplated that a portion of the strap trailing portion $T_2$ could be gripped during tensioning of the strap loop instead of gripping the end segment E.

The joint between overlapping portions of thermoplastic strap may conventionally include a form of face-to-face bonding of the overlapping strap portions. The bonding may be effected with a suitable adhering means, such as adhesive or the like.

However, a widely used commercial joint employed with overlapping thermoplastic strap portions is the welded joint. Such a joint is typically made by heating the strap so that part of the thickness of each strap length joint portion at the interface region melts or fuses. The overlapping strap joint portions are pressed together, either during or immediately after, the melting of the strap thickness parts. The strap portions are then allowed to cool while in face-to-face contact. The melted part of each strap portion cools to form a substantially continuous resolidified thickness part merged with the substantially continuous resolidified thickness part of the other strap portion to define a weld joining the overlapping strap lengths. This method may be employed with both of the overlapping strap portions under tension or, more commonly, with only one or both of the strap portions in an untensioned condition.

The cooling and resolidification of the overlapping strap portions may, depending upon the particular welding technique, take place under pressure or under substantially no pressure. Further, depending upon the particular welding technique employed, the strap portions may either be allowed to cool and completely resolidify in the absence of tension or may be allowed to only partially cool and only partially resolidify before being subjected to some applied tension loading.

Conventional techniques for heating thermoplastic strap portions during the joint welding process include contacting the overlapping joint portions with a heated member or effecting bodily sliding movement of one or both of the overlapping strap portions to generate heat by friction. Other means for heating the strap portions that have been suggested include increasing the thermal energy of the strap portions by subjecting the strap portions to certain types of radiation. Depending upon the type of radiation employed, this may require providing the thermoplastic strap with additives for absorbing or reacting with the radiation.

In any event, since a bonded or welded joint is susceptible to a mode of failure in which the overlapping portions "peel" apart, the present invention addresses this mode of failure by providing an improved joint configuration between overlapping thermoplastic strap portions which resists, to a greater extent than do conventional joints, those components of strap forces acting in directions that are not aligned with, or that are not parallel to, the joint and which contribute to a lower joint peel strength.

The present invention may be employed in a single device for performing the dual functions of (1) creating a welded joint and (2) providing the desired improved configuration of the overlapping strap portions at the welded joint. However, it is contemplated that the apparatus of the present invention may also be employed to provide an improved configuration of overlapping strap portions at an already formed joint or prior to forming the joint.

The apparatus of the present invention is particularly well-suited for use with friction-fusion joint welding techniques and may be readily employed to create a friction-fusion welded joint as well as to provide the improved strap configuration that yields increased peel strength.

The apparatus of the present invention has been found to be especially effective with polyester strap, such as polyethylene terephthalate having an intrinsic viscosity in the range of about 0.62 to 0.80. Strap fabricated from such a material has been found to produce a good weld, especially when the weld is created by friction-fusion techniques. The apparatus of the present invention has been found to function especially well with such a strapping material in providing the improved configuration of the overlapping strap portions in the joint region.

Figure 2B:
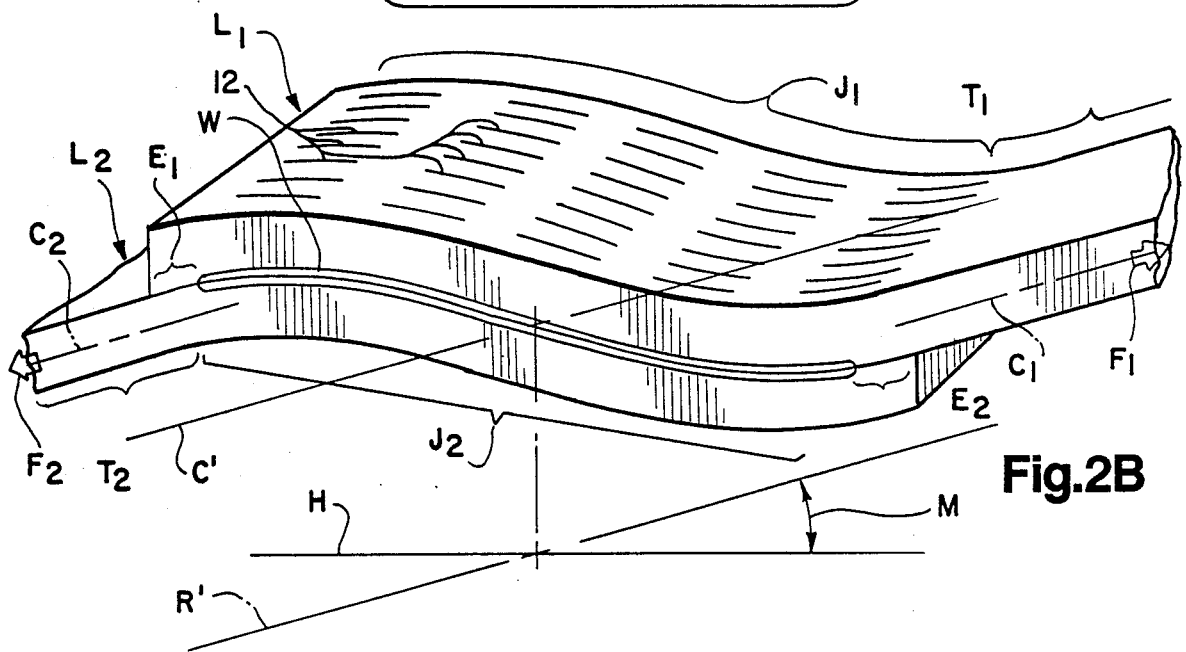
FIG. 2B is a view similar to FIG. 2A, but showing a modified joint.
Figure 2A:
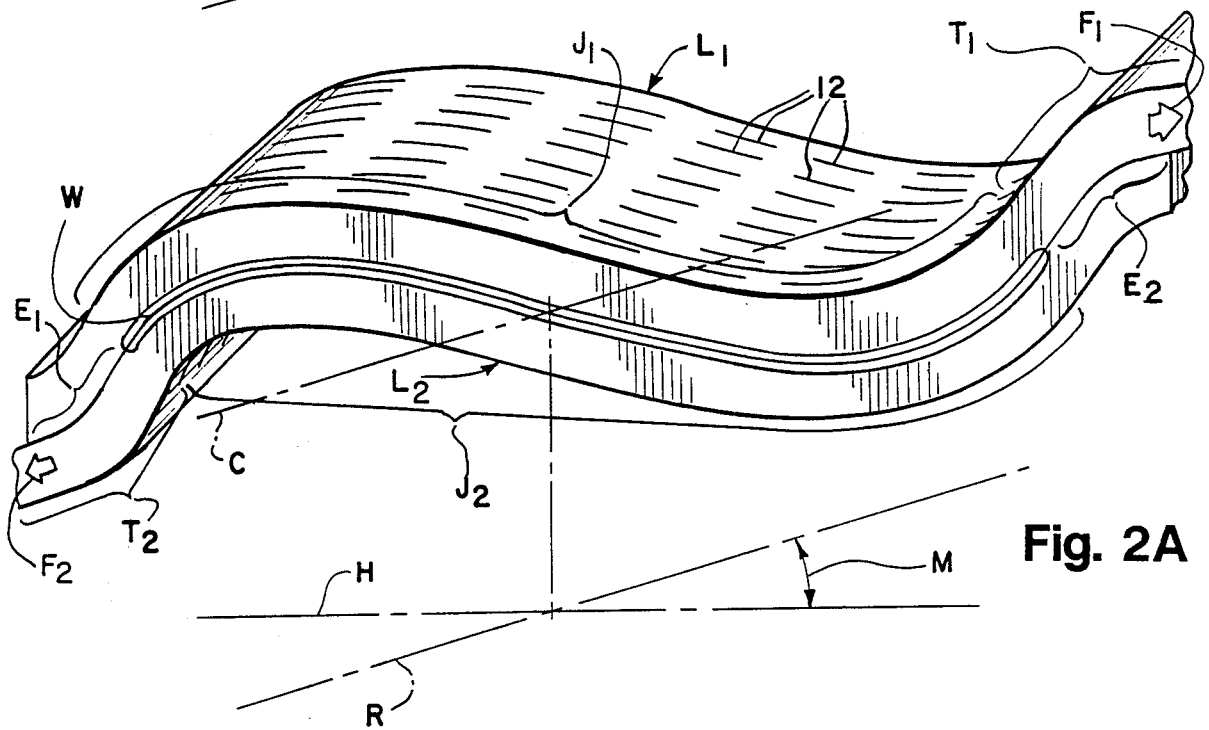
FIG. 2A is a greatly englarged, fragmentary, perspective view of a welded joint between overlapping lengths of thermoplastic strap (not necessarily shown to scale)

An improved configuration of overlapping lengths of flexible thermoplastic strap in a friction-fusion welded joint region is illustrated in FIG. 2A. The joint is formed between a first length $L_1$ of thermoplastic strap and a second length $L_2$ of thermoplastic strap. The length $L_1$ includes at least a first joint portion $J_1$, and the length $L_2$ includes at least a second joint portion $J_2$.

The joint portions $J_1$ and $J_2$ are welded together in a face-to-face relationship along an interface region or weld W. In the form of the joint illustrated in FIG. 2A, the weld W results from the fusion or melting of a part of the thickness of each strap length joint portion $J_1$ and $J_2$ at the interface region. Upon cooling, each melted part forms a substantially continuous resolidified thickness part merged with the substantially continuous resolidified thickness part of the other strap length joint portion to define the weld W.

The length $L_1$ also includes an associated trailing portion $T_1$ extending from the first joint portion $J_1$, and the second length $L_2$ includes an associated trailing portion $T_2$ extending from the second joint portion $J_2$. Each trailing portion $T_1$ and $T_2$ extends from the associated joint portion $J_1$ and $J_2$, respectively, generally in a direction away from the other strap length trailing portion. The trailing portions $T_1$ and $T_2$ are defined during the initial formation of the joint configuration as each having at least a part of their length extending in a plane generally parallel to a reference plane R. The trailing portions $T_1$ and $T_2$ may be longer than, or considerably shorter than, the joint portions $J_1$ and $J_2$.

In FIG. 2A, the reference plane R has been arbitrarily selected and is shown at an angle M to the horizontal (line H). The overlapping strap lengths $L_1$ and $L_2$ have been oriented so that at least part of each of the lengths of the associated trailing portions $T_1$ and $T_2$ are generally parallel to the reference plane R. Further, in the particular configuration illustrated in FIG. 2A, at least part of the length of the trailing portion $T_1$ is generally coplanar with at least part of the length of the trailing portion $T_2$. This is illustrated by a plane C which is oriented parallel to the reference plane R and which lies along the middle of the strap thickness of part of the length of the trailing portion $T_1$ and along the middle of part of the length of the trailing portion $T_2$.

Thus, it can be seen that when tension is applied to the strap trailing portions $T_1$ and $T_2$ of the joint in FIG. 2A, the tension force would act in the direction of the tension force arrows $F_1$ and $F_2$ substantially along the common plane C. With this configuration, the trailing portions $T_1$ and $T_2$ are not offset from each other and, hence, the tension forces $F_1$ and $F_2$ do not apply a moment with respect to a line of action along the common plane C.

As best illustrated in FIG. 2A, the weld W has an orientation such that the length of the weld W includes portions which are not parallel to the reference plane R. Indeed, in the preferred form illustrated, the weld W includes at least a convex portion at the left-hand end and a concave portion at the right-hand end. Further, the weld W crosses the common plane C and may be characterized as having a central region which is generally downwardly angled or sloping from left to right as viewed in FIG. 2A.

It is also to be noted that the first strap length $L_1$ may include a leading end $E_1$ which extends beyond the left-hand end of the weld W and which is not joined directly to the underlying strap length $L_2$. Similarly, on the other end of the weld W, the second strap length $L_2$ has a leading end $E_2$ which extends beyond the end of the weld W and which is not directly connected to the overlying first strap length $L_1$. Depending upon the precise manner in which the joint is formed, the end portions $E_1$ and $E_2$ may be eliminated altogether, may be substantially longer than shown relative to the weld W, or may be of different (unequal) lengths.

The configuration of the joint illustrated in FIG. 2A would react under tension (through applied forces $F_1$ and $F_2$) so as to reduce the loading forces on the weld W that would tend to peel the two strap lengths $L_1$ and $L_2$ apart. Thus, the peel resistance of the weld joint would be increased.

It has been found that increased peel resistance is obtained even if the ends of the weld W are further offset such that the trailing portion $T_1$ of the strap length $L_1$ is below a central plane C' as illustrated for a preferred, modified form of the joint in FIG. 2B. In FIG. 2B, the trailing portion $T_1$ extends in a plane $C_1$, and the trailing portion $T_2$ extends in a plane $C_2$. The planes $C_1$ and $C_2$ are parallel to a reference plane R' and to the central plane C'. In the FIG. 2B configuration, the tension force $F_1$ is offset from, and is not coplanar with, the tension force $F_2$. The external forces $F_1$ and $F_2$ are parallel, however. The resulting distribution of internal forces through the weld W nevertheless advantageously differs from the distribution of the substantial sheer forces found in a conventional joint wherein the weld W lies generally in a plane between, and parallel to, parallel strap joint portions (e.g., the "parallel" joint portions $J_1$ and $J_2$ in FIG. 1).

If the apparatus of the present invention is designed to also function as the means for creating the welded joint in addition to merely forming the contoured strap configuration, then the apparatus may preferably be provided with suitable strap engaging teeth for gripping the outer surfaces of the strap. Marks in the surface of the strap resulting from such strap gripping teeth are illustrated in FIGS. 2A and 2B on the surfaces of the strap lengths $L_1$ and $L_2$ where such marks are indicated by the reference numeral 12.

Figure 3:
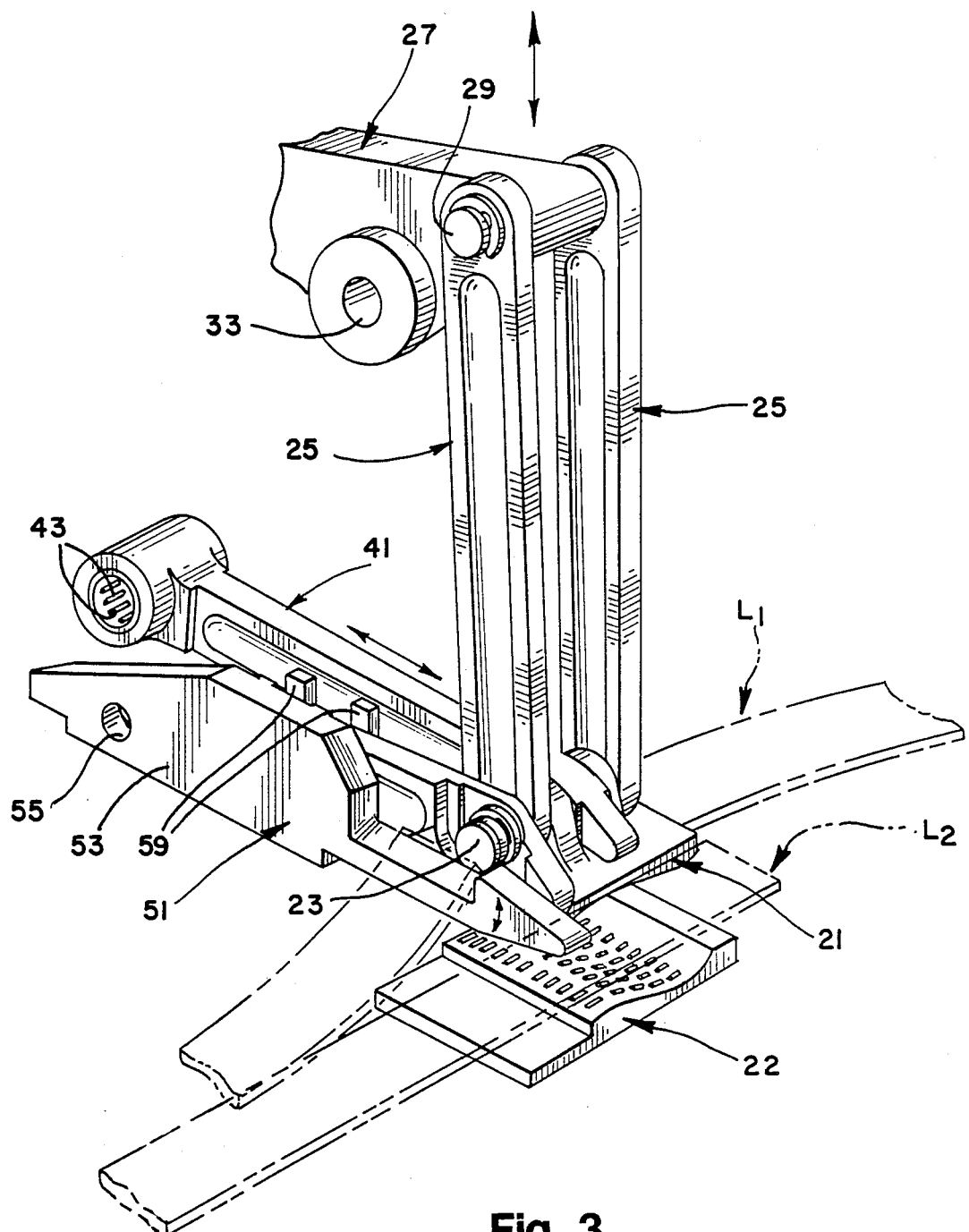
FIG. 3 is a fragmentary, perspective view of an embodiment of apparatus in accordance with the teachings of the present invention shown at an early point in the sequence of forming an improved strap configuration in the region where the modified joint of FIG. 2B is to be created by friction-fusion welding.
Figure 4:
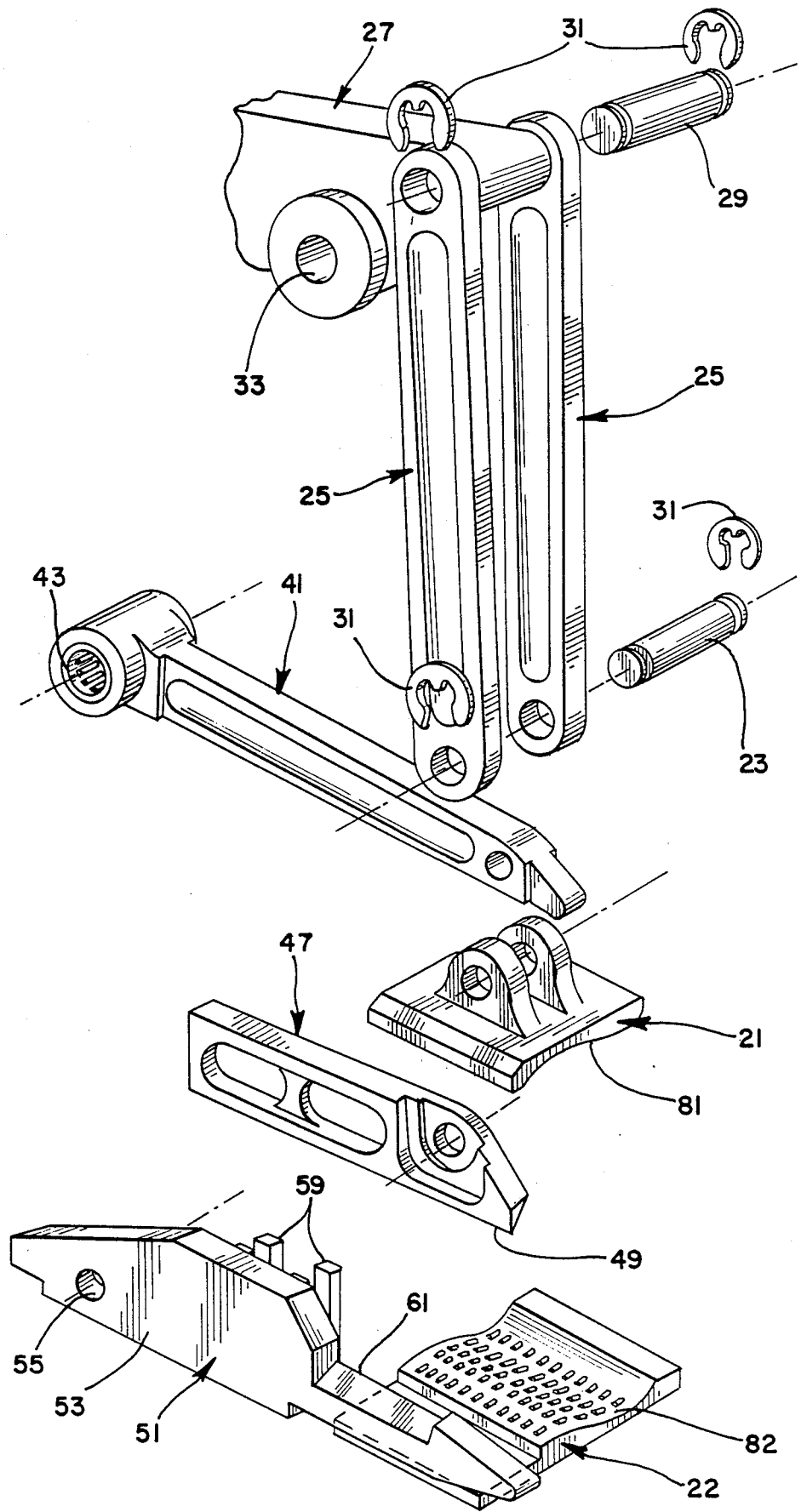
FIG. 4 is an exploded, perspective view of the apparatus illustrated in FIG. 3.

FIGS. 3-9 illustrate one embodiment of a preferred form of the apparatus of the present invention for forming the improved strap joint configuration illustrated in FIG. 2B. The apparatus includes a first strap engaging member 21 and a second strap engaging member 22. As best illustrated in FIG. 3, the strap engaging members 21 and 22 are adpated to be disposed in an initially spaced-apart position for receiving the overlapping strap lengths $L_1$ and $L_2$. As best illustrated in FIGS. 3 and 4, the first strap engaging member 21 is adapted to be moved relative to the second strap engaging member 22 which may be stationary and fixed to a suitable support, such as to the frame of a strapping tool or machine.

In the prefered embodiment illustrated, the first strap engaging member 21 is pivotally mounted by means of a shaft 23 to a pair of downwardly depending arms 25 which are pivotally mounted at their upper ends to a crank arm 27 via a shaft 29. The shafts 23 and 29 are retained in position by clips 31.

The shaft 23 is parallel to the strap lengths $L_1$ and $L_2$. This permits the member 21 to pivot as necessary to accommodate proper engagement with the strap length $L_1$. It is also contemplated that the second strap engaging member 22 may be pivotally mounted to the apparatus below the first strap engaging member 21. The pivot axis would be parallel to the strap lengths $L_1$ and $L_2$ and permit the strap engaging member 22 to pivot as necessary to accommodate engagement with the strap length $L_2$.

The first strap engaging member crank arm 27 includes a bearing 33 for pivotally mounting the crank arm 27 about a shaft (not illustrated) to permit a rocking movement of the crank arm 27 to effect a vertically reciprocating movement of the first strap engaging member 21.

A generally horizontally disposed arm 41 is connected at one end to the first strap engaging member 21 via the shaft 23 and includes a bearing 43 at the other end for being mounted to an eccentric drive shaft (not illustrated) for producing a generally horizontal reciprocating movement of the first strap engaging member 21.

If it is desired to automatically sever the strap length from a supply of strap, then an upper knife member 47 may be mounted via shaft 23 along one end of the first strap engaging member 21. The upper knife member 47 includes a downwardly oriented knife edge 49 (FIGS. 4 and 5).

Figure 5:
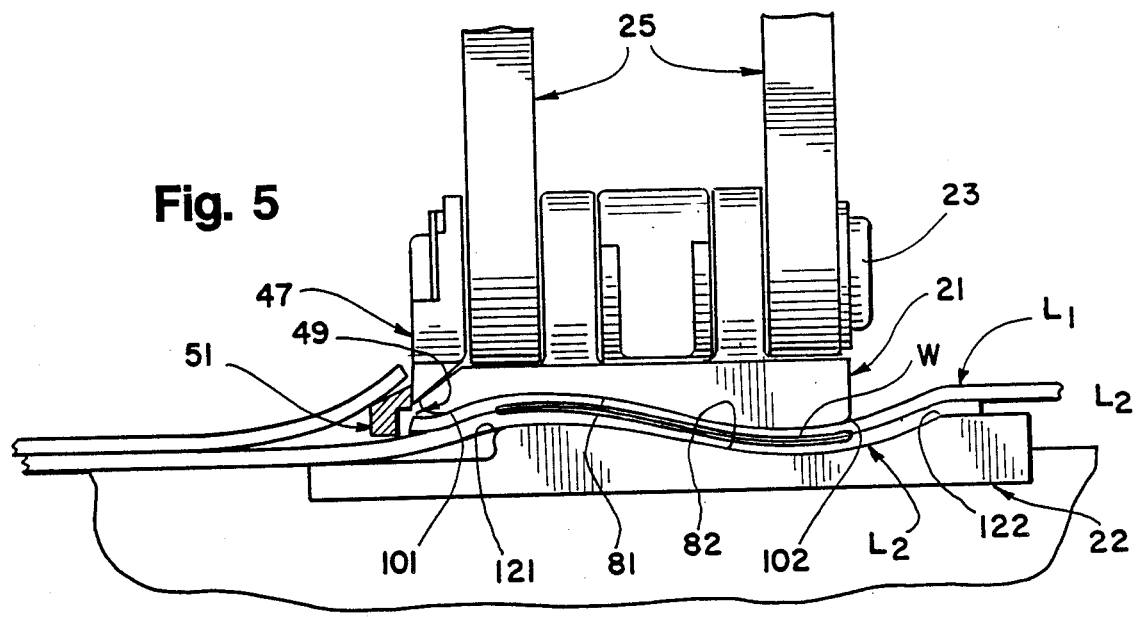
FIG. 5 is a fragmentary, front elevational view of the apparatus in a fully closed position about the overlapping strap lengths.

A lower knife member 51 is provided adjacent the second strap engaging member 22 (FIGS. 4 and 5). The lower knife member 51 includes a rearwardly projecting plate 53 defining a bearing 55 for accommodating the pivotal mounting of the lower knife member 51 about a shaft (not illustrated) of the tool for permitting the lower knife member 51 to be lifted upwardly to facilitate placement or removal of the strap portions.

The lower knife member 51 also includes a pair of parallel posts 59 which are connected to the bottom of the knife member plate 53 and which are spaced outwardly from one side of the plate 53 so that the upper knife member 47 can be received between the posts 59 and plate 53 (see FIG. 3) of the lower knife member 51.

The front end of the lower knife member 51 includes an upwardly directed cutting edge 61 (FIG. 4) positioned to coact with the upper knife member cutting edge 49 for severing the upper strap length $L_1$ when the upper knife member 47 is urged downwardly with the first strap engaging member 21.

With reference to FIG. 5 it is seen that the first strap engaging member 21 can be moved downwardly toward the second strap engaging member 22 to press the strap lengths $L_1$ and $L_2$ together. Initially, when the strap engaging members 21 and 22 are separated, the overlapping strap lengths $L_1$ and $L_2$ are positioned generally in vertical registry with the second strap length $L_2$ located to extend under the lower knife member 51 and with the first strap length $L_1$ positioned over the lower knife member 51. Then, as illustrated in FIG. 5, the first strap engaging member 21 can be moved downwardly to compress the strap lengths $L_1$ and $L_2$ together against the second strap engaging member 22. As the upper strap engaging member 21 moves downwardly, the upper knife member 47 forces the upper strap length $L_1$ downwardly against the lower knife member 51 to sever the portion of the upper strap length $L_2$ beyond the joint region.

It will be appreciated that the strap lengths $L_1$ and $L_2$ may be under tension (e.g., if they are part of a tensioned strap encircling an object). On the other hand, the strap lengths $L_1$ and $L_2$ may be completely untensioned. Even if the strap lengths $L_1$ and $L_2$ are part of a strap loop that is tensioned about an article, the tension may be relieved on one or both of the overlapping strap joint portions $J_1$ and $J_2$ in the region of the joint. To this end, conventional strap gripping members or mechanisms (not illustrated) may be provided on each side of the strap engaging members 21 and 22 for tightly gripping the strap lengths $L_1$ and $L_2$ to hold tension in the rest of the strap loop while maintaining the overlapping portions of the strap lengths $L_1$ and $L_2$ in a substantially untensioned condition. The strap gripping members for holding tension in the loop may be of conventional design and form no part of the present invention.

In general, the forming of a joint in tensioned strap portions may require more energy to maintain the overlapping portions in a face-to-face relationship and to, if friction-fusion welding techniques are employed, effect relative vibratory movement between the overlapping strap portions. The greater energy required for accommodating the joining of overlapping strap portions while under tension is more easily handled in a large strapping machine. In a smaller strapping tool, where the motor and component sizes are typically smaller, it could be preferable to maintain at least one, if not both, of the overlapping strap portions in a substantially untensioned condition during the process of forming the improved joint configuration with the apparatus of the present invention.

Figure 6:
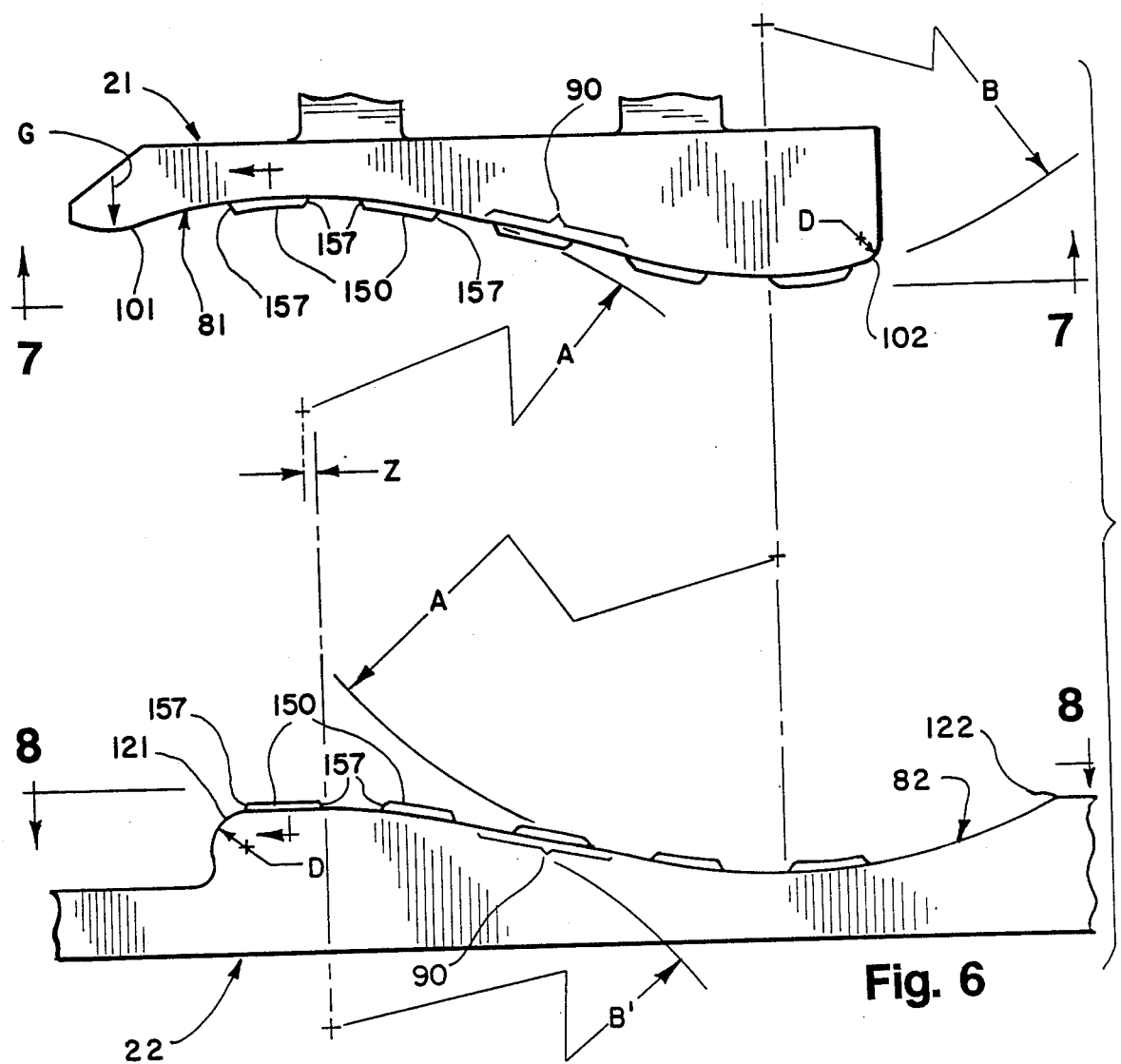
FIG. 6 is a greatly enlarged, fragmentary, front elevational view of the strap engaging members of the apparatus of the present invention.

The strap engaging members 21 and 22 have a novel contoured surface means and arrangement that provide the improved configuration of the strap lengths which will accommodate the formation of the improved joint. The novel contoured surface means of the strap engaging members are most clearly seen in FIGS. 6-9. FIG. 6 best illustrates the unique profile of each strap engaging member.

The first strap engaging member 21 includes a first contoured surface means or surface 81 for contacting a face of the first strap length $L_1$. Similarly, the second strap engaging member 22 has a second contoured surface means or surface 82 for contacting a face of the second strap length $L_2$. Each surface 81 and 82 may be characterized as a surface that is generated by a straight line segment as it is maintained perpendicular to a plane (e.g., the plane of FIG. 6) and moved along a path on that plane. More particularly, as best illustrated in FIG. 6, each surface 81 and 82 includes a concave surface which, in the preferred embodiment illustrated in FIG. 6, is a partially cylindrical surface having a radius A. Each engaging surface 81 and 82 also has a major convex surface, which in the preferred embodiment illustrated in FIG. 6, is a partially cylindrical surface having a radius B. Further, in the preferred embodiment, each engaging surface 81 and 82 includes a planar surface 90 between, and merging with, the concave surface and convex surface.

It has been found that when the strap engaging members 21 and 22 are employed in an apparatus for creating a friction-fusion welded joint, the strap joint portions tend to first become molten adjacent the planar regions 90 of the strap engaging members 21 amd 22, and the molten region then propagates toward the ends of the strap engaging members 21 and 22. This has been found to result in a more consistent production of higher peel strength welded joints.

In a preferred form of the strap engaging members 21 and 22 for use with polyethylene terephthalate strap having a thickness of between about 0.81 mm. and about 0.96 mm., the radius A of the concave surface is about 17 mm. and the radius B of the convex surface is about 14 mm. The difference in radii accommodates the "inside" and "outside" curvature of strap lengths in conformity with the curvature of the surfaces 81 and 82. For practical reasons, including reasons relating to manufacturing tolerances, part location inaccuracies, and strap thickness variations, the 3 mm. difference between the curvature radii A and B was selected to be about four times the strap thickness.

On each strap engaging member 21 and 22, the planar surface 90 between the concave surface and the major convex surface has a length of about 8.8 mm. Further, with reference to FIG. 6, it is seen that the center of curvature of the radius A concave surface of the first strap engaging member 21 is offset a distance Z to the left of the center of curvature of the radius B convex surface of the second strap engaging member 22. It has been found that this aids in controlling the friction-fusion welding process so that the strap material first becomes molten adjacent the flat areas 90.

Further, at the right-hand end of the strap engaging member 21 as viewed in FIG. 6, the convex surface terminates with a very small radius D. Similarly, at the left-hand end of the second strap engaging member 22 as viewed in FIG. 6, the convex surface terminates in a very small radius D. In a preferred form of the strap engaging members for use with polyethylene terephthalate strap having a thickness of between 0.81 mm. and 0.96 mm., the radius D is about 1 mm. It has been found that the radii D function to some extent to provide a diverging nozzle effect which aids in molten material flow during the friction-fusion welding process.

With reference to FIG. 6, it will be appreciated that the convex surface of the first strap engaging member 21 projects in a direction toward the second strap engaging member 22 further than does the concave surface of the strap engaging member 21. Similarly, the convex surface of the second strap engaging member 22 projects toward the first strap engaging member 21 further than does the concave surface of the second strap engaging member 21.

In a preferred form of the strap engaging members, the maximum amplitude of the waveform defined by the concave surface and the convex surface of each member is about 1.8 mm. for use with strap having a thickness of about 0.81 mm. to about 0.96 mm. The maximum amplitude of the waveform surfaces can be alternatively described as the maximum perpendicular distance defined by the following exercise: (1) drawing a line tangent to the curve defined by the concave surface of the one strap engaging member at a point closest to the other strap engaging member, (2) drawing a line tangent to the curve defined by the convex surface of the one strap engaging member at a point furthest from the other strap engaging member, which line would be parallel to the first line, and (3) measuring the perpendicular distance between the two tangent lines. This distance would correspond to the maximum "peak to valley" amplitude of the curve defined by the convex and concave surfaces of the one strap engaging member.

The first engaging surface 81 of the first strap engaging member 21 can be further characterized as having a first end 101 (FIG. 5) that is adapted to contact the first strap length $L_1$ outwardly of a first end of the interface joint region W and has a second end 102 (FIG. 5) adapted to contact the first strap length $L_1$ adjacent a second end of the interface joint region W.

Similarly, the second engaging surface 82 of the second strap engaging member 22 has a first end 121 (FIG. 5) that is adapted to contact the second strap length $L_2$ adjacent the first end of the interface joint region W and has a second end 122 (FIG. 5) adapted to contact the second strap length $L_2$ beyond the second end of the interface region W.

As is clear from FIGS. 5 and 6, the first and second strap engaging members 21 and 22 are juxtaposed in a relationship wherein the second end 102 of the first engaging surface 81 is located between the first end 121 and second end 122 of the second engaging surface 82. Similarly, the first end 121 of the second engaging surface 82 lies between the first end 101 and second end 102 of the first engaging surface 81.

It will also be recognized, with reference to FIGS. 5 and 6, that the portion of the first engaging surface 81 extending beyond the first end 121 of the second engaging surface 82 curves toward the second strap engaging member 22. Similarly, the portion of the second engaging surface 82 extending beyond the second end 102 of the first engaging surface 81 curves toward the first strap engaging member 21.

When the apparatus of the present invention is used in a friction-fusion welding tool with the cutter members 47 and 51, it has been found to be beneficial to provide a convex curvature on the left-hand end of the first strap engaging member 21 extending outwardly from the first end 101 of the first engaging surface 81. This curvature is identified in FIG. 6 by the radius G, and this curvature functions to reduce the stress on the strap length $L_1$ as the first strap engaging member 21 pushes the strap length $L_1$ downwardly against the lower cutting member 51. In the preferred form of the strap engaging members for use with polyethylene terephthalate strap having a thickness of between 0.81 mm. and 0.96 mm., the radius G is about 4 mm.

Additionally, with reference to FIG. 5, it will be appreciated that, when the strap engaging members 21 and 22 of the illustrated preferred embodiment are in the closed or clamping position about the strap lengths $L_1$ and $L_2$, the space between the engaging surfaces 81 and 82 is generally uniform along the length of the strap engaging members between the first end 121 of the second engaging surface 82 and the second end 102 of the first engaging surface 81. In the preferred form of the apparatus of the present invention, the uniform spacing relationship is also maintained when the strap engaging members 21 and 22 are moved further apart to a strap release position.

The strap engaging members 21 and 22 of the present invention may be adapted for use in a strapping tool and may be adapted to perform substantially simultaneously two different functions, namely: (1) providing an improved configuration of the first and second overlapping strap lengths $L_1$ and $L_2$ and (2) producing a friction-fusion welded joint between the overlapping strap portions. To this end, relative bodily sliding movement must be effected between the overlapping strap portions by the strap engaging members 21 and 22. To facilitate this, the strap engaging members 21 and 22 are preferably provided with a plurality of strap engaging teeth 150.

Figure 7:
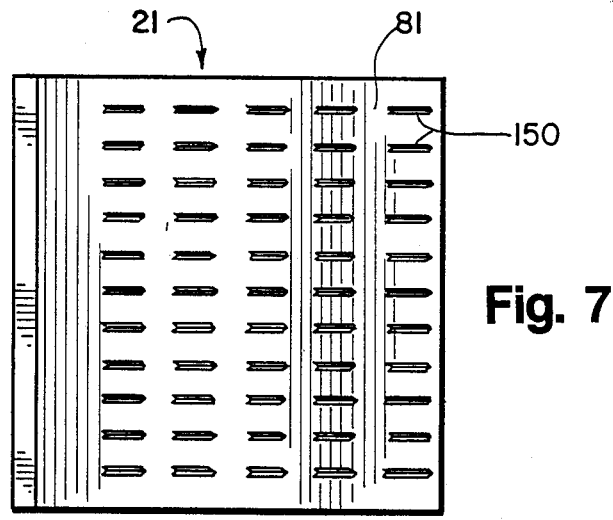
FIG. 7 is a view taken generally along the plane 7—7 in FIG. 6.
Figure 8:
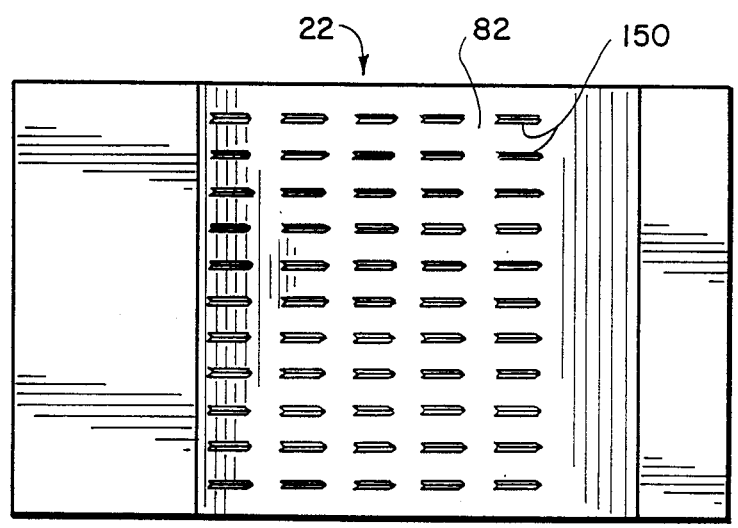
FIG. 8 is a view taken generally along the plane 8—8 in FIG. 6.
Figure 9:
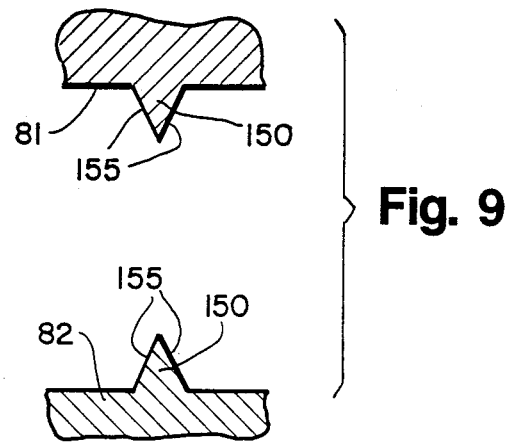
FIG. 9 is a greatly enlarged, fragmentary, cross-sectional view taken generally along the plane 9—9 in FIG. 6.

As best illustrated in FIGS. 6-8, the teeth 150 on the first strap engaging member 21 are in registry with the teeth 150 on the second strap engaging member 22. The teeth are arranged in rows on each strap engaging member. Each member has five rows of teeth, and each row includes 11 teeth. The teeth 150 are uniformly spaced apart in each row across the width of the engaging surface of each engaging member.

The rows of teeth are preferably uniformly spaced, and the center line spacing between adjacent rows of teeth is about 4 mm. for strap having a thickness between about 0.81 mm. and 0.96 mm. For such strap, the teeth 150 are also preferably uniformly spaced apart in each row with the center line spacing between adjacent teeth in each row being about 2 mm.

Each tooth projects above the engaging surface about 0.3 mm. and has the general shape of an elongate triangular prism defined by two elongate sloping side walls 155 (FIG. 9) and two sloping end walls 157 (FIG. 6).

The configuration, size, orientation, spacing, and number of teeth 150 may be varied depending upon, among other things, the type of strap, the width and thickness of the strap, the operating forces imposed on the strap by the strap engaging members, etc. In some situations, it is contemplated that the teeth may be eliminated altogether—especially if the strap engaging members are employed only to provide the improved strap configuration rather than to also provide means for creating a friction-fusion joint between the overlapping strap portions.

It will be appreciated that the strap engaging members 21 and 22 of the present invention may be efficiently and readily employed in a friction-fusion strapping tool for forming a friction-fusion welded joint as well as for providing the improved strap configuration at the joint, which configuration will increase the peel resistance of the joint. When the strap engaging members 21 and 22 of the present invention are employed in that manner, suitable conventional operating means may be used for effecting relative vertical movement between the strap engaging members 21 and 22 between (1) the open position (permitting the placement of overlapping strap lengths $L_1$ and $L_2$ between the strap engaging members 21 and 22) and (2) a closed position (wherein the strap engaging members 21 and 22 press the overlapping strap lengths $L_1$ and $L_2$ together). To this end, the vertical motion linkage components 25 and 27 illustrated in FIG. 3 may be operated with a suitable conventional mechanism. Various conventional mechanisms are described in U.S. Pat. Nos. 4,776,905, 4,313,779, and 3,442,732. The details of such mechanisms form no part of the present invention.

Similarly, suitable conventional mechanisms may be provided for laterally reciprocating (vibrating) the first strap engaging member 21 when it is engaged against the overlapping strap portions so as to produce the friction for creating the welded joint. Such a conventional vibrating mechanism may be operatively connected to the first strap engaging member 21 through, for example, the arm 41 (FIG. 3). Various conventional strap engaging member vibrating mechanisms are disclosed in U.S. Pat. Nos. 4,776,905, 4,313,779, and 3,442,732. The details of such mechanisms form no part of the present invention.

After sufficient heat has been generated to melt the interface region of the overlapping strap portions, the vibratory movement of the strap engaging member 21 may be terminated. In some situations it may be desired to allow the vibratory movement of the strap engaging member and vibrating drive mechanism to be damped to zero by the frictional forces that are present in the apparatus and by the resistance of the melted strap portions. On the other hand, it has been found that, in some circumstances and with some types of strap, it can be preferable to terminate the vibratory movement of the strap engaging member 21 substantially instantaneously by immediately disconnecting the more massive vibrating drive mechanism from the less massive strap engaging member. To this end, a suitable conventional disengaging mechanism and associated control system can be provided. The details of such a mechanism form no part of the present invention.

In some applications, and with some strapping materials, it may be desired to release the pressure on the overlapping strap portions as soon as a sufficient thickness of each strap portion has melted at the interface. Of course, if the pressure is released while the strap portions are still molten, the strap joint portions must be isolated from any tension to which other parts of the strap may be subjected. In other applications, the pressure may be maintained on the overlapping strap portions for a period of time to permit the melted strap portions to cool and at least partly solidify under pressure.

In the preferred form of the present invention, wherein the strap engaging members 21 and 22 are employed to create a friction-fusion joint with polyethylene terephthalate strap having an intrinsic viscosity of 0.8, having a thickness between 0.81 mm. and 0.96 mm., and having a width of about 16 mm., it has been found that a joint having improved peel resistance is produced when the upper strap engaging member 21 is vibrated at 320 hertz through a maximum amplitude of 1.8 mm. under a pressure of 1,334 Newtons for a time interval of about 0.5 seconds. The strap portions were untensioned during friction welding and during a pressurized cool down interval of about 4 seconds. The strap engaging member 21 was disengaged from the vibratory drive means at the end of the 0.5 second vibration time interval so that the strap vibration was terminated substantially instantaneously. The resulting joint weld was 22 mm. in length and had substantially parallel trailing portions offset about 5 mm. The joint had a permanent deformation configuration as shown in FIG. 2B (not to scale).

The values of these operational parameters may be changed, depending upon the precise joint characteristics desired. Additionally, the change of one parameter (e.g., pressure) may require a change in one or more other parameters (e.g., vibration frequency or duration). Further, these parameters may change depending upon, among other things, strap width, strap thickness, and strap material characteristics.

With reference to FIG. 5, it will be appreciated that the strap engaging surfaces 81 and 82 are oriented such that the portions of the overlapping strap lenths $L_1$ and $L_2$ extending beyond the left-hand (first) end 121 of the second strap engaging member 22 slant generally upwardly from left to right. Also, the portions of the overlapping strap lengths $L_1$ and $L_2$ extending from the right-hand (second) end 102 of the first strap engaging member 21 slant generally upwardly from left to right. This results in the strap length trailing portions $T_1$ and $T_2$ at each end of the joint region lying along a plane parallel to the reference plane R' illustrated in FIG. 2B. This orientation, coupled with the non-parallel relationship of the interface joint W, is believed to contribute to the improved joint strength. In addition, the above-described orientation minimizes the amount of loop tension that is lost by virtue of the positioning of the second strap engaging member 22 on the inside of the strap loop between the strap and the package or article being bound by the strap loop.

The preferred form of the strap engaging members 21 and 22 illustrated in FIGS. 3–9 are designed for use with strap having a thickness ranging between about 0.81 mm. and about 0.96 mm. so that the trailing portions of the strap are oriented parallel to, but offset from, each other about 4.8 mm. in the untensioned condition. That is, with reference to FIG. 2B, the plane $C_1$ of trailing portion $T_1$ is offset about 4.8 mm. from the plane $C_2$ of the trailing portion $T_2$. Generally, over-compensation in forming the strap configuration is required if the joint is going to be subjected to strap loop tension prior to the completed joint weld cooling to room temperature.

It has been found that the above-described offset joint configuration retains an offset of about two strap thicknesses after the joint has been subjected to repeated loading and unloading of a sustained tension force of 800 pounds.

It will also be appreciated that the surface configuration of the strap engaging members 21 and 22 may be altered from the particular configuration illustrated in FIGS. 5–9. For example, the strap engaging surfaces 81 and 82 may be less curved (or substantially planar) and oriented at an angle for producing the configuration of the increased strength joint illustrated in FIG. 5 of the above-identified copending U.S. patent application Ser. No. 07/347,569.

IMPROVEMENT OF A PREVIOUSLY FORMED JOINT

It will be appreciated that the novel strap engaging members of the present invention may be employed with an already-formed strap joint to provide the improved configuration of the overlapping strap portions in the joint region. In that case, a permanent set in the overlapping strap portions in conformity with the surfaces of the strap engaging members 21 and 22 can be achieved by pressing the strap engaging members together about the strap lengths with sufficient force under conditions that, depending upon the type of strap material, thickness, and other factors, would produce a permanent deformation or set in the overlapping strap portions.

To this end, it is desired to impart enough energy to the joint portions to effect at least partially inelastic deformation of the joint portions so as to provide a sufficient amount of permanent deformation throughout the overlapping strap portions. Upon release of the strap engaging members 21 and 22, the overlapping strap portions will then maintain the desired configuration substantially in conformance with the surface configuration of the strap engaging members.

The deformation may be advantageously effected at elevated temperatures. The overlapping strap portions may be heated by a variety of means. For example, heat may be conducted into the strap engaging members which are in contact with the overlapping strap portions.

Alternatively, the overlapping strap portions may be clamped together by the strap engaging members in an atmosphere having a suitably elevated temperature (e.g., in an oven).

Also, the temperature of the strap portions may be raised by subjecting the strap portions to certain types of radiation. The strap may even be provided with additives that more readily absorb or react with the radiation.

In one process for effecting post-joint deformation, a conventional welded joint may be conventionally formed in flat overlapping strap lengths. Then, while the joined strap lengths are still hot, the joined strap lengths can be transferred to the novel strap engaging members of the present invention for deformation of the joined strap lengths.

In another process, the joint forming apparatus could include a pair of adjustable strap engaging members that change shape from a flat profile for initially forming a conventional, flat, welded joint to a non-flat profile for subsequently deforming the joint in accordance with the present invention.

FORMATION OF STRAP CONFIGURATION PRIOR TO JOINT FORMATION

It will be appreciated that the above-described strap engaging members of the present invention will function to force overlapping strap lengths into the desired configuration in conformity with the strap engaging member surfaces. The deformation could be effected prior to permanently joining together the overlapping strap portions. The temperature of the overlapping strap portions may be elevated to provide a permanent set or deformation of the strap portions in conformity with the strap engaging members. The unconnected, but deformed, overlapping strap portions could then be released from the strap engaging members Subsequently, the deformed portions of the overlapping strap lengths could be joined together by suitable means (e.g., adhesive bonding or welding) in a manner that would not significantly disturb the configuration of the joint portions.

It will be readily observed from the foregoing detailed description of the invention and of the described embodiments thereof that numerous variations and modifications may be effected without departing from the true spirit and scope of the novel concepts or principles of this invention.

What is claimed is:

1. An apparatus for providing an improved configuration of first and second lengths of flexible thermoplastic strap to accommodate the formation of an improved joint therebetween, said apparatus comprising:
   first and second opposed strap engaging members adapted to receive between them said strap lengths arranged in an overlapping relationship and to press said lengths together; each said member defining a contoured surface for engaging one of said strap lengths; each said contoured surface including a generally convex surface and a generally concave surface; said strap engaging members being disposed to align said concave surface of said first member generally in registry with said convex surface of said second member and to align said convex surface of said first member generally in registry with said concave surface of said second member.

2. The apparatus in accordance with claim 1 in which a planar surface is defined between, and merges with, said convex and concave surfaces of each said strap engaging meber.

3. The apparatus in accordance with claim 1 further including means for heating said strap lengths.

4. The apparatus in accordance with claim 1 further including means for moving one of said strap engaging members toward and away from the other strap engaging member.

5. The apparatus in accordance with claim 1 in which said first strap engaging member is mounted for pivoting movement about an axis oriented generally parallel to said strap lengths.

6. Apparatus for providing an improved configuration of first and second lengths of flexible thermoplastic strap to accommodate the formation of an improved joint therebetween wherein said lengths each have a joint portion and an associated trailing portion extending from said joint portion in a direction away from the other strap length trailing portion, said apparatus comprising:
   first and second strap engaging members respectively defining first and second contoured surface means for engaging respectively said first and second strap lengths to position said joint portions between said members in an overlapping relationship along an interface region and to position at least part of the length of said trailing portion of each said strap length to extend in a plane generally parallel to a reference plane with at least a part of the length of said interface region being non-parallel to said reference plane.

7. The apparatus in accordance with claim 6 in which said apparatus includes pressing means for effecting relative movement between said strap engaging members to press said strap joint portions together.

8. The apparatus in accordance with claim 7 in which
   said strap engaging members are adapted to engage said strap lengths in an initially unjoined condition; and
   said apparatus further includes joint forming means operatively associated with said pressing means and with said strap engaging members for forming a joint between said joint portions while said strap lengths are pressed together by said strap engaging members.

9. The apparatus in accordance with claim 7 in which said apparatus further includes heating means for increasing the thermal energy of said strap length joint portions when said joint portions are pressed together between said strap engaging members.

10. The apparatus in accordance with claim 9 in which said heating means further includes fusion joint forming means for effecting fusion of a part of the thickness of each said strap length joint portion at said interface region whereby each said part, upon cooling, forms a substantially continuous resolidified thickness part merged with the substantially continuous resolidified thickness part of the other strap length joint portion to define a weld joining said strap lengths.

11. The apparatus in accordance with claim 10 in which said heating means comprises vibrating means for vibrating one of said strap engaging members while engaged with one of said strap length joint portions to effect relative bodily sliding movement between said strap length joint portions whereby sufficient heat is generated by friction to increase the thermal energy of each said strap length joint portion to (1) render each said strap length joint portion into a sufficiently plastic condition under the imposed pressure such that a permanent deformation set is maintained upon removal of said heat and pressure, and (2) effect said fusion of said part of the thickness of each said joint portion.

12. The apparatus in accordance with claim 6 in which
said first and second contoured surface means include first and second engaging surfaces, respectively, whereby said first engaging surface is adapted to contact one face of said first strap length and whereby said second engaging surface is adapted to contact one face of said second strap length.

13. The apparatus in accordance with claim 12 in which
said first engaging surface has a first end adapted to contact said first strap length outwardly of a first end of said interface region and has a second end adapted to contact said first strap length joint portion adjacent a second end of said interface region;
said second engaging surface has a first end adapted to contact said second strap length joint portion adjacent said first end of said interface region and has a second end adapted to contact said second strap length beyond said second end of said interface region;
said first and second strap engaging members are juxtaposed in a relationship wherein said second end of said first engaging surface is located between the first and second ends of said second engaging surface and wherein said first end of said second engaging surface lies between said first and second ends of said first engaging surface;
the portion of said first engaging surface extending beyond the first end of said second engaging surface curves toward said second strap engaging member; and
the portion of said second engaging surface extending beyond the second end of said first engaging surface curves toward said first strap engaging member.

14. The apparatus in accordance with claim 12 in which each said strap engaging surface is defined as a surface generated by a straight line segment as it is maintained perpendicular to a plane and moved along a path on that plane.

15. The apparatus in accordance with claim 12 in which each said engaging surface includes a concave surface and a convex surface which are connected by a planar surface merging with said convex and concave surfaces.

16. The apparatus in accordance with claim 15 in which each said convex and concave surface is a partially cylindrical surface.

17. The apparatus in accordance with claim 15 in which said convex surface of said first engaging surface projects in a direction toward said second strap engaging member further than said concave surface of said first engaging surface.

18. The apparatus in accordance with claim 15 in which said convex surface of said second engaging surface projects toward said first strap engaging member further than said concave surface of said second strap engaging member.

19. The apparatus in accordance with claim 12 in which the space between said engaging surfaces of said first and second strap engaging members is uniform along the length of said strap engaging members between the first end of said second engaging surface and said second end of said first engaging surface.

20. The apparatus in accordance with claim 12 in which the maximum distance between parallel lines tangent to the curves defined by said concave surface of said first engaging surface and said convex surface of said first engaging surface is about 1.8 mm.

21. The apparatus in accordance with claim 12 in which the maximum distance between parallel lines tangent to the curves defined by said concave surface of said second engaging surface and said convex surface of said second engaging surface is about 1.8 mm.

22. The apparatus in accordance with claim 12 in which each said strap engaging member includes a plurality of teeth projecting outwardly from the associated engaging surface.

23. The apparatus in accordance with claim 22 in which the teeth on said first strap engaging member are in registry with the teeth on said second strap engaging member.

24. The apparatus in accordance with claim 22 in which each tooth generally has the shape of an elongate triangular prism defined by two elongate sloping side walls and two sloping end walls.

25. The apparatus in accordance with claim 22 in which each tooth projects above the associated engaging surface about 0.3 mm.

26. The apparatus in accordance with claim 22 in which said teeth are arranged in rows on each said first and second engaging surface.

27. The apparatus in accordance with claim 26 in which each said engaging surface has 5 rows of said teeth.

28. The apparatus in accordance with claim 26 in which each said row of teeth includes 11 teeth.

29. The apparatus in accordance with claim 26 in which said teeth are uniformly spaced apart in each row across the width of each said engaging surface.

30. The apparatus in accordance with claim 26 in which
said rows of teeth are uniformly spaced; and
the center line spacing between adjacent rows of teeth is about 4 mm.

31. The apparatus in accordance with claim 26 in which
said teeth are uniformly spaced apart in each said row; and
the center line spacing between adjacent teeth in each row is about 2 mm.

32. The apparatus in accordance with claim 6 further including means for pivotally mounting said first strap engaging member to accommodate pivoting movement relative to said second strap engaging member.

33. The apparatus in accordance with claim 6 in which said first strap engaging member is movable relative to said second strap engaging member.

34. The apparatus in accordance with claim 6 in which one of said strap engaging members is movable toward and away from the other strap engaging member to receive said two strap length joint portions in one of two conditions: (1) a previously joined condition and (2) an initially unjoined condition.

35. The apparatus in accordance with claim 6 in which said first strap engaging member is mounted for pivoting movement about an axis oriented generally parallel to said strap lengths.

36. Apparatus for forming an assembly of first and second joined lengths of flexible thermoplastic strap which each have a joint portion and an associated trailing portion extending from said joint portion in a direction away from the other strap length trailing portion, said apparatus comprising:

first and second opposed contoured surface means for engaging said strap lengths to position said joint portions between said opposed contoured surface means in an overlapping face-to-face relationship along an interface region and for orienting at least a part of the length of each strap length trailing portion to extend in a plane generally parallel to a reference plane with at least a part of the length of said interface region being non-parallel to said reference plane; and deforming and joining means for effecting relative movement between said opposed contoured surface means to press said strap joint portions together and join said joint portions while supplying sufficient energy to effect a permanent deformation of said strap joint portions in conformity with said opposed contoured surface means.

37. The apparatus in accordance with claim 36 in which said apparatus has first and second strap engaging members defining respectively said first and second opposed contoured surface means; and said deforming and joining means include:
(a) pressing means for effecting relative movement between said strap engaging members to press said strap length joint portions together, and
(b) vibrating means for vibrating one of said strap engaging members while engaged with one of said strap length joint portions to effect relative bodily sliding movement between said strap length joint portions whereby sufficient heat is generated by friction to increase the thermal energy of each said strap length joint portion to (1) render each said strap length joint portion into a sufficiently plastic condition under the imposed pressure such that a permanent deformation set is maintained upon removal of said heat and pressure, and (2) effect fusion of a part of the thickness of each said strap length joint portion at said interface region whereby each said part, upon cooling, forms a substantially continuous resolidified thickness part merged with the substantially continuous resolidified thickness part of the other strap length joint portion to define a weld joining said strap lengths.

38. The apparatus in accordance with claim 37 in which said vibrating means includes control means for terminating the strap engaging member vibration substantially instantaneously.

39. The apparatus in accordance with claim 37 in which said pressing means includes pressing control means for operating said pressing means to press said strap length joint portions together under a pressure of about 1,334 Newtons for a time interval of about 4.5 seconds; and said vibrating means includes vibrating control means for operating said vibrating means to vibrate said one strap engaging member at about 320 hertz through a maximum amplitude of about 1.8 mm. for a time interval of about 0.5 seconds.

40. The apparatus in accordance with claim 37 in which said first strap engaging member is mounted for pivoting movement about an axis oriented generally parallel to said strap lengths.

41. Apparatus for providing an improved configuration of overlapping first and second joined lengths of flexible thermoplastic strap to accommodate the formation of an improved joint therebetween wherein said lengths each have a joint portion and an associated trailing portion extending from said associated joint portion in a direction away from the other strap length trailing portion and wherein said joint portion of one strap length is joined to the other strap length along an interface region, said apparatus comprising:

first and second strap engaging members respectively defining first and second contoured surface means for engaging respectively said first and second strap lengths to
(1) position said joint portions between said strap engaging members with one of said joint portions being located between said interface region and one of said strap engaging members and with the other of said joint portions being located between said interface region and the other of said strap engaging members, and
(2) position at least a part of the length of said trailing portion of each said strap length to extend in a plane generally parallel to a reference plane with at least a part of the length of said interface region being non-parallel to said reference plane.

42. The apparatus in accordance with claim 41 in which said first strap engaging member is mounted for pivoting movement about an axis oriented generally parallel to said strap lengths.

* * * * *